United States Patent
Loitz et al.

(10) Patent No.: US 7,607,558 B2
(45) Date of Patent: Oct. 27, 2009

(54) FRICTION STIR WELDING TOOL WITH COUNTERBEARING FOR MOUNTING ON A HANDLING DEVICE

(75) Inventors: Henry Loitz, Hamburg (DE); Shahram Sheikhi, Escheburg (DE); Jens P. Wulfsberg, Neritz (DE); Jorge F. Dos Santos, Avendorf (DE)

(73) Assignee: GKSS-Forschungzentrum Geesthacht GmbH, Geesthacht (DE)

( * ) Notice: Subject to any disclaimer, the term of this patent is extended or adjusted under 35 U.S.C. 154(b) by 346 days.

(21) Appl. No.: 11/546,180

(22) Filed: Oct. 11, 2006

(65) Prior Publication Data

US 2007/0080195 A1   Apr. 12, 2007

(30) Foreign Application Priority Data

Oct. 11, 2005   (DE) .................... 10 2005 049 865

(51) Int. Cl.
   *B23K 20/12*   (2006.01)
(52) U.S. Cl. .................. 228/2.1; 228/112.1
(58) Field of Classification Search ............. 228/112.1, 228/2.1, 2.2
   See application file for complete search history.

(56) References Cited

U.S. PATENT DOCUMENTS

| 5,769,306 A | 6/1998 | Colligan |
| 6,050,475 A * | 4/2000 | Kinton et al. ............ 228/112.1 |
| 6,070,784 A | 6/2000 | Holt et al. |
| 6,199,745 B1 * | 3/2001 | Campbell et al. ........ 228/112.1 |
| 6,259,052 B1 | 7/2001 | Ding et al. |
| 2002/0046864 A1 | 4/2002 | Bellino et al. |
| 2004/0079787 A1 * | 4/2004 | Okamoto et al. ......... 228/112.1 |
| 2005/0092809 A1 | 5/2005 | Murakami |

FOREIGN PATENT DOCUMENTS

| DE | 10305651 | 3/2004 |
| EP | 0752926 | 1/1997 |
| EP | 810054 | 12/1997 |
| EP | 888843 | 1/1999 |
| JP | 2002346768 | 12/2002 |

(Continued)

OTHER PUBLICATIONS

European Search Report for EP 06 02 1254.

*Primary Examiner*—Jessica L. Ward
*Assistant Examiner*—Steven Ha
(74) *Attorney, Agent, or Firm*—Marshall, Gerstein & Borun LLP

(57) ABSTRACT

Illustrated and described is a friction stir welding device for mounting on a handling device. The object that the forces and moments which have to be absorbed by the handling device during the welding operation in the course of the movement of the friction stir welding tool along the weld seam are independent of the welding operation is achieved by a friction stir welding device with a tool drive, with a mounting element for connection to the handling device, with a friction stir welding tool, which is driven by the tool drive in a rotating manner about an axis of rotation, with a counterbearing roller and with a counterbearing drive, the counterbearing drive driving the counterbearing roller in a rotating manner about a counterbearing axis and the circumferential surface of the counterbearing roller being arranged opposite the friction stir welding tool.

17 Claims, 2 Drawing Sheets

FOREIGN PATENT DOCUMENTS

| | | |
|---|---|---|
| JP | 2005199337 | 7/2005 |
| JP | 2005313227 | 11/2005 |
| WO | WO-9310935 | 6/1993 |
| WO | WO-9526254 | 10/1995 |
| WO | WO 98/13167 * | 4/1998 |
| WO | WO-0136143 | 5/2001 |
| WO | WO-02098595 | 12/2002 |
| WO | WO-03064100 | 8/2003 |

* cited by examiner

FRICTION STIR WELDING TOOL WITH COUNTERBEARING FOR MOUNTING ON A HANDLING DEVICE

CROSS-REFERENCE TO RELATED APPLICATION

The present application claims the benefit of priority of German Patent Application No. 10 2005 049 865.5 filed Oct. 11, 2005. The entire text of the priority application is incorporated herein by reference in its entirety.

FIELD OF THE INVENTION

Background of the Invention

Friction stir welding is generally known from the prior art. WO 93/10935 discloses for example inserting a friction stir welding tool, formed as a pin, into the joint between workpieces that are adjacent to each other and are to be connected and setting the said pin in rotation, the pin having a greater hardness and a higher melting point than the material of the workpieces. During rotation of the pin, the workpieces are pressed against each other, so that the edge region of the two workpieces is plasticized by the friction between the pin and the workpieces. If the pin is moved further along the joint, the plasticized material solidifies again, and a weld seam can be produced in this way.

It is also known from WO 95/26254 that, apart from butt joint connections, so-called lap joint connections, in which the workpieces to be connected lie one on top of the other, can also be produced with the aid of friction stir welding. For this purpose, the friction stir welding tool is placed onto the surface of one workpiece and set in rotation, so that the upper workpiece is plasticized. Subsequently, the tool is pressed so deep into the upper workpiece that the region of the lower workpiece lying adjacent to the upper workpiece is also plasticized. After that, the tool is moved parallel to the surface of the workpieces, so that a weld seam forms.

For producing a friction stir welding connection between workpieces, it is customary to clamp the workpieces and to suspend the friction stir welding device with the drive for the tool on a handling device such as an industrial robot, so that the rotating friction stir welding tool can be moved by the robot along the intended weld seam.

However, this gives rise to the problem that the robot must absorb both the forces which occur due to the linear movement of the tool in the plane of the workpieces for forming the weld seam and those which are applied by the tool perpendicularly to the surface of the workpieces, since the workpieces are fastened on a workpiece mount and the robot represents the "connection" between workpieces on the one hand and the friction stir welding tool on the other hand. In particular in the case of lap joint connections, these forces are extraordinarily great, since the robot then has to absorb the pressure with which the tool is pressed by the workpieces in the direction of the intended weld seam. This makes it necessary that, in particular in the case of lap joint connections, the drives of the robots must be made very powerful and the robots themselves must be made very stable.

SUMMARY OF THE INVENTION

Therefore, starting out from the prior art, the present invention is based on the object of providing a friction stir welding device for mounting on a handling device in the case of which the forces and moments which have to be absorbed by the handling device during the welding operation in the course of the movement of the friction stir welding tool along the weld seam are independent of the welding operation.

According to the invention, this object is achieved by a friction stir welding device with a tool drive, with a mounting element for connection to the handling device, with a friction stir welding tool, which is driven by the tool drive in a rotating manner about an axis of rotation, with a counterbearing roller and with a counterbearing drive, the counterbearing drive driving the counterbearing roller in a rotating manner about a counterbearing axis and the circumferential surface of the counterbearing roller being arranged opposite the friction stir welding tool.

The counterbearing roller itself, provided on the friction stir welding device, has the effect that the forces which are exerted by the friction stir welding tool perpendicularly to the surface of the workpieces on the latter are absorbed directly by the device and do not have to be intercepted by the handling device. In addition, the counterbearing drive, which is connected to the counterbearing roller, ensures that the forces which are exerted on the workpieces parallel to their surface are also absorbed by the device itself instead of being passed on to the handling device. This means that the handling device only has to apply the forces which are required for the movement of the friction stir welding device itself.

During operation, the friction stir welding device according to the invention behaves neutrally in terms of forces and moments with respect to the outside, which means that no additional forces or torques are transferred to the handling device by the friction stir welding operation.

In a structurally simple and compact, preferred setup of the device, the mounting element is fastened on the tool drive. Furthermore, the counterbearing drive is supported by the tool drive.

According to a further preferred embodiment, the axis of rotation of the friction stir welding tool and the counterbearing axis run in a common plane. This means that forces which are exerted in the axial direction of the friction stir welding tool and consequently substantially perpendicularly to the surface of the workpieces on the latter act directly on the counterbearing axis. This has the advantage that no torques which could possibly cause damage to the counterbearing drive occur parallel to the counterbearing axis.

In a further preferred way, the axis of rotation of the friction stir welding tool in this case runs perpendicularly to the counterbearing axis, so that the forces exerted by the friction stir welding tool in its axial direction act perpendicularly to the circumferential surface of the counterbearing roller and the counterbearing roller is not subjected to any uneven loading.

In another preferred embodiment, the distance between the friction stir welding tool and the counterbearing roller is variable. As a result, on the one hand the workpieces can be clamped in simple way, on the other hand the device can be adapted to the strength of the workpieces to be connected. In this case, in a further preferred way, the counterbearing drive is held on the tool drive by means of a linear drive, so that the distance can easily be set.

If the distance between the counterbearing roller and the friction stir welding tool is to be regulated during the welding to a specific value, it is also advantageous if a position sensor for sensing the distance between the friction stir welding tool and the counterbearing roller is provided.

In order to ensure that the movement of the handling device and the advancement of the tool with respect to the stationary workpieces proceed synchronously and forces or moments do not in fact act on the handling device, it is also preferred if the counterbearing drive has an interface for the connection to the control of the handling device. Then, the movement of the handling device can be adapted to that of the counterbearing roller and consequently the advancement.

In order to achieve a homogeneous weld seam with a visually satisfactory surface, the friction stir welding tool has in another preferred embodiment a pin running parallel to the axis of rotation and a shoulder running perpendicularly to the pin.

BRIEF DESCRIPTION OF THE DRAWINGS

The present invention is explained below on the basis of a drawing that merely shows a preferred exemplary embodiment. In the drawing.

DETAILED DESCRIPTION OF THE INVENTION

Figure 1:
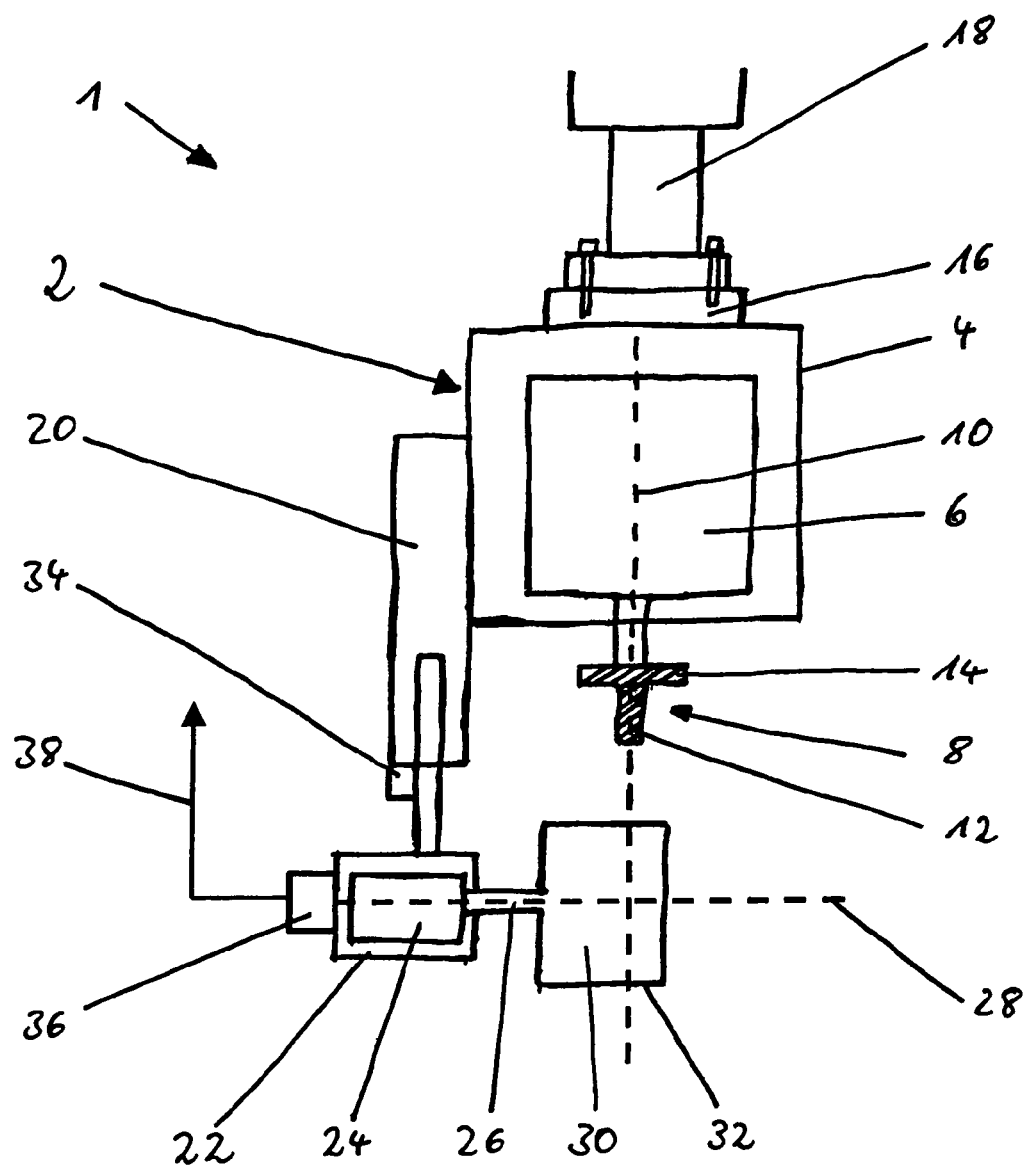
FIG. 1 shows an exemplary embodiment of a device according to the invention in longitudinal section and FIG. 2 shows a lap connection in cross section, as can be produced with the device according to the invention.

The friction stir welding device 1 illustrated in FIG. 1 has a tool drive 2, which comprises a housing 4 and a motor 6 arranged therein. Connected to the motor 6 is a friction stir welding tool 8, the friction stir welding tool 8 being driven by the tool drive 2 in a rotating manner about an axis of rotation 10. The friction stir welding tool 8 comprises a pin 12, running parallel to the axis of rotation 10, and a shoulder 14, extending perpendicularly thereto. Also provided on the tool drive 2 is a mounting element 16, by means of which the device 1 is connected to an arm 18 of an industrial robot (not represented any more specifically).

Furthermore, the friction stir welding device 1 has a linear drive 20, which is fastened on the tool drive 2 and by means of which the counterbearing drive 22 is held. The counterbearing drive 22 has a counterbearing motor 24, the motor shaft 26 of which defines the counterbearing axis 28. In this exemplary embodiment, preferred to this extent, the axis of rotation 10 and the counterbearing axis 28 run in a common plane, so that the axes 10, 28 intersect. Furthermore, the motor shaft 26 and the motor 6 are fitted in such a way that the axis of rotation 10 and the counterbearing axis 28 run perpendicularly to each other.

This arrangement of the friction stir welding tool 8 and the counterbearing axis 28 achieves the effect that forces which run in the axial direction of the friction stir welding tool 8 act directly on the counterbearing axis 28 and no torques occur parallel to the counterbearing axis 28.

Fitted on the motor shaft 26 is a counterbearing roller 30, the circumferential surface 32 of which lies opposite the friction stir welding tool 8. In this case, the counterbearing roller 30 is driven by the counterbearing motor 24 in a rotating manner about the counterbearing axis 28. The distance between the counterbearing roller 30 and the friction stir welding tool 8 can be changed by the linear drive 20. For this purpose, the linear drive 20 is also provided with a position sensor 34.

Finally, the counterbearing drive 22 has an interface 36, via which the counterbearing drive 22 can be connected by a line 38 to a control (not shown) of the industrial robot.

Figure 2:
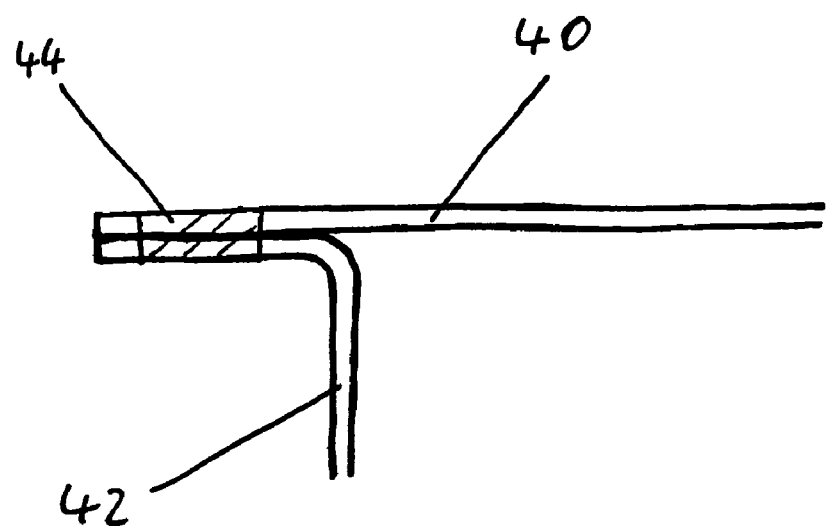

By means of the device 1 illustrated in FIG. 1, it is possible in particular for lap connections represented in FIG. 2 to be produced between a first workpiece 40 and a second workpiece 42. The arrangement of the workpieces 40, 42 that is represented in FIG. 2 occurs for example in the case of tanks for trucks. The first workpiece 40 in this case forms the jacket surface and the second workpiece 42 forms an end surface inserted therein. In order that the end surface tightly closes off the tank volume, it is required that a lap weld seam 44 is created along the circumference of the end surface or of the second workpiece 42. This can be carried out by means of the device 1 according to the invention in the following way.

Firstly, the first and the second workpiece 40, 42 are arranged between the friction stir welding tool 8 and the counterbearing roller 30 in such a way that the region of the weld seam 44 to be formed is positioned above the counterbearing roller 30. Subsequently, the friction stir welding tool 8 is set in rotation by means of the tool drive 2, and the distance between the counterbearing roller 30 and the friction stir welding tool 8 is reduced by means of the linear drive 20, so that the pin 12 comes into contact with the first workpiece 40, the latter is plasticized by friction, and the pin 12 then penetrates further into the workpieces 40, 42. When the shoulder 14 abuts also against the first workpiece 40, the linear drive 20 is stopped, it being possible with the aid of the position sensor 34 for the reaching of this position to be monitored.

Instead of sensing the position of the counterbearing roller 30 with respect to the tool 8, it is however also conceivable to regulate the distance between the counterbearing roller 30 and the tool 8 by means of the force applied by the linear drive 20, the linear drive 20 being stopped when a predetermined force which is applied by the linear drive 20 is exceeded. This can be determined by means of the current consumed by the linear drive 20.

The fact that the workpieces 40, 42 lie against the counterbearing roller 30 during the axial movement of the tool 8 means that the robot arm 18 does not have to absorb the forces and moments required for this.

In order to produce the lap weld seam along the circumference of the second workpiece 42, the counterbearing roller 30 is driven by the counterbearing drive 22 in a rotating manner, so that an advancement is produced, by which the device 1 is moved along the intended weld seam 44. In this case, a signal which indicates the advancing rate of the counterbearing roller 30 is transmitted via the interface 36 to the control of the industrial robot. As a result, the robot can move the device 1 synchronously in a manner corresponding to the advancing rate along the weld seam 44. The force which is required to press the friction stir welding tool 8 or the pin 12 through the material of the workpieces 40, 42 is in this case applied by the counterbearing drive 22 and does not have to be absorbed by the robot.

The device 1 according to the invention with the counterbearing roller 30 and the counterbearing drive 22 connected thereto has the effect that both the forces perpendicularly to the workpieces 40, 42 and the forces and moments occurring parallel to the surface of the first workpiece 40 during the movement of the tool 8 are absorbed directly by the device 1, and the forces occurring in the robot are greatly reduced. In particular, the device 1 behaves during the welding neutrally in terms of forces and moments with respect to the outside, i.e. no additional forces are exerted by the welding operation on the robot. Consequently, the requirements for the robot with regard to the stability and power of the drives are significantly reduced.

The device 1 according to the invention with the counterbearing roller 30 and the counterbearing drive 22 connected thereto has the effect that both the forces perpendicularly to the workpieces 40, 42 and the forces and moments occurring parallel to the surface of the first workpiece 40 during the movement of the tool 8 are absorbed directly by the device 1, and the forces occurring in the robot are greatly reduced. In particular, the device 1 behaves during the welding neutrally in terms of forces and moments with respect to the outside, i.e. no additional forces are exerted by the welding operation on the robot. Consequently, the requirements for the robot with regard to the stability and power of the drives are significantly reduced.

What is claimed:

1. Friction stir welding device (1) for mounting on a handling device,
    with a tool drive (2),
    with a mounting element (16) for connection to the handling device,
    with a friction stir welding tool (8), which is driven by the tool drive (2) in a rotating manner about an axis of rotation (10),
    with a counterbearing roller (30) having a circumferential surface (32) and
    with a counterbearing drive (22),
    the counterbearing drive (22) driving the counterbearing roller (30) in a rotating manner about a counterbearing axis (28) and
    the circumferential surface (32) of the counterbearing roller (30) being arranged opposite the friction stir welding tool (8), wherein the distance between the friction stir welding tool (8) and the counterbearing roller (30) is variable and the counterbearing drive (22) is held on the tool drive (2) by means of a linear drive (20).

2. Friction stir welding device according to claim 1, the mounting element (16) being fastened on the tool drive (2) and the counterbearing drive (22) being supported by the tool drive (2).

3. Friction stir welding device according to claim 1, the axis of rotation (1) of the friction stir welding tool (8) and the counterbearing axis (28) running in a common plane.

4. Friction stir welding device according to claim 1, the axis of rotation (1) of the friction stir welding tool (8) running perpendicularly to the counterbearing axis (28).

5. Friction stir welding device according to claim 1, a position sensor (34) for sensing the distance between the friction stir welding tool (8) and the counterbearing roller (30) being provided.

6. Friction stir welding device according to claim 1, the counterbearing drive (22) having an interface (36) for the connection to the control of the handling device.

7. Friction stir welding device according to claim 1, the friction stir welding tool (8) having a pin (12), running parallel to the axis of rotation (10), and a shoulder (14), running perpendicularly to the pin (12).

8. Friction stir welding device according to claim 2, the axis of rotation (1) of the friction stir welding tool (8) and the counterbearing axis (28) running in a common plane.

9. Friction stir welding device according to claim 2, the axis of rotation (1) of the friction stir welding tool (8) running perpendicularly to the counterbearing axis (28).

10. Friction stir welding device according to claim 3, the axis of rotation (1) of the friction stir welding tool (8) running perpendicularly to the counterbearing axis (28).

11. Friction stir welding device according to claim 2, the distance between the friction stir welding tool (8) and the counterbearing roller (30) being variable.

12. Friction stir welding device according to claim 3, the distance between the friction stir welding tool (8) and the counterbearing roller (30) being variable.

13. Friction stir welding device according to claim 4, the distance between the friction stir welding tool (8) and the counterbearing roller (30) being variable.

14. Friction stir welding device according to claim 2, the counterbearing drive (22) having an interface (36) for the connection to the control of the handling device.

15. Friction stir welding device according to claim 3, the counterbearing drive (22) having an interface (36) for the connection to the control of the handling device.

16. Friction stir welding device according to claim 2, the friction stir welding tool (8) having a pin (12), running parallel to the axis of rotation (10), and a shoulder (14), running perpendicularly to the pin (12).

17. Friction stir welding device according to claim 3, the friction stir welding tool (8) having a pin (12), running parallel to the axis of rotation (10), and a shoulder (14), running perpendicularly to the pin (12).

* * * * *